May 30, 1933.    S. H. CLARK    1,912,255
GASKET
Filed Jan. 19, 1932
Fig. 1.
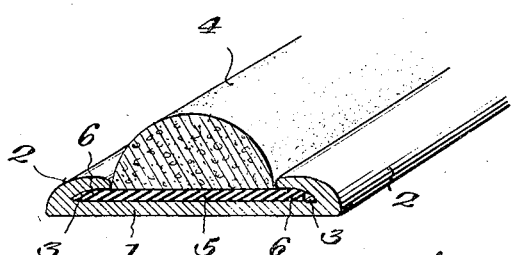
Fig. 2.
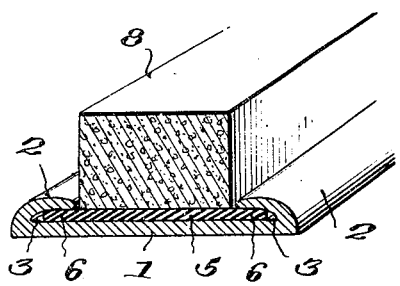
Fig. 4.
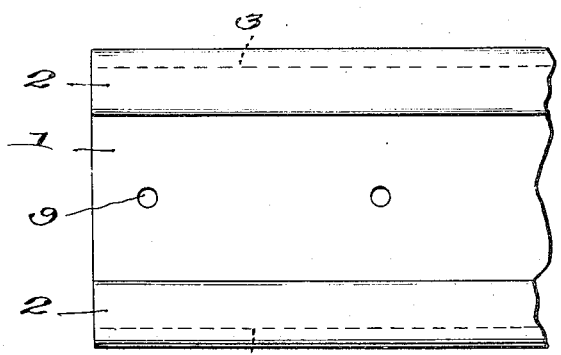
Fig. 6.
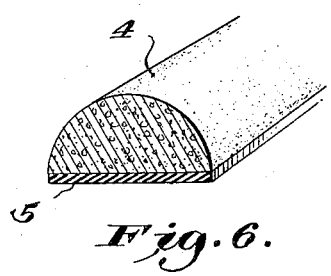
Fig. 5.
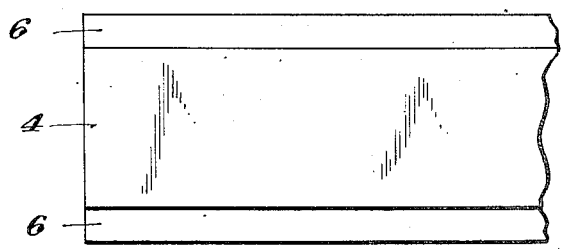
Fig. 7.
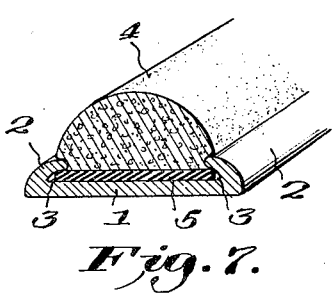
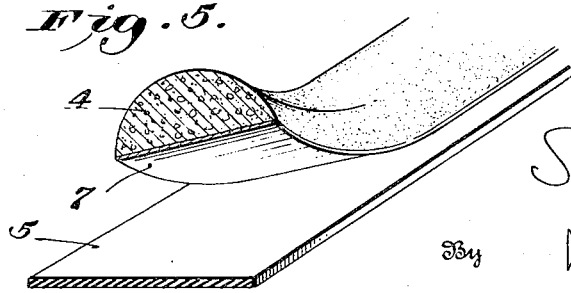
Inventor
Stewart H. Clark
By Pope & Kirchner
Attorneys Patented May 30, 1933

1,912,255

UNITED STATES PATENT OFFICE

STEWART HARVEY CLARK, OF UNION CITY, INDIANA

GASKET

Application filed January 19, 1932. Serial No. 587,587.

This invention relates to gaskets in the nature of weatherstripping adapted to be mounted on one of a pair of cooperating closure members for securing the cooperating surfaces thereof against passage of heat and cold. The invention has special reference to the type of gasket especially adapted to be mounted on refrigerator casings and doors. It is to be understood that the structure contemplated by the invention is of wide general application and hence is adapted to be used with any kind or type of closure members, whether hinged together, slidably associated or otherwise related.

The invention relates more particularly to gaskets including a relatively soft packing body, provided with means for securing said body in mounted position.

Embodiments of the invention include as means for mounting the packing body, a channeled member of metal or other rigid material, adapted to be initially applied to a door or door jamb, and to receive and retain the packing body which forms an element of an insert for the channeled member.

It is an object of the invention to provide a gasket structure of the type indicated which will efficiently perform its intended functions, which may be economically manufactured and quickly and inexpensively applied to operative position.

The invention is shown in certain preferred forms of embodiment on the accompanying drawing which forms part of this application for Letters Patent and in which the same reference character designates corresponding parts in the several views.

In the drawing,

Figure 1 is a perspective view, with one end in section, of one embodiment of the invention;

Fig. 2 is a similar view of a modified form of embodiment;

Fig. 3 is a plan view of the channel element;

Fig. 4 is a plan view of the insert;

Fig. 5 is a perspective view of the insert with the elements thereof partially disassociated; and Figs. 6 and 7 are cross sectional views of a modified form of insert and a complete gasket structure including such insert, respectively.

An important element of the gasket is a body of relatively soft, deformable and resilient material adapted to function as a packing for sealing the cooperating surfaces of a pair of closure members. Another element of the gasket is a channeled base by means of which the soft packing body is mounted. An important feature of the invention is the association with the packing body and the base of a third element lacking the softness and deformability of the packing body, and hence adapted for securing a more or less permanent association with the channel.

Referring particularly to the drawing, the reference character 1 designates generally a channeled base member of metal or equivalent material having upwardly and inwardly turned side walls 2, 2, which are interiorly undercut or spaced away from the base of the channel to provide internal recesses 3, 3, along each side of the channel. In the channel is received an insert, which includes a relatively soft, deformable and resilient body 4 of packing material, and a bottom strip 5 of harder and more rigid material securely united to the packing body 4. The width of strip 5 may be greater than that of the body 4, which is centrally positioned thereon, so that side margins 6, 6, of the strip 5 project from the body 4. These margins 6, 6, are adapted to enter within and be retained by the undercut recesses 3, 3, of the channel member 1.

It will be evident that it is desirable to form the body 4 of a material which is soft, deformable and resilient, to facilitate the sealing function of the body. I prefer to form the body 4 of sponge rubber, or equivalent rubber having a relatively coarse and open cellular structure. Other suitable material however may be employed, such as felt or the like. It will be evident that the required physical characteristics of the body 4 would prevent the relatively thin flanges of the body from being securely retained in the recesses 3, 3. For this reason I form the bottom strip 5 of a material which is harder and more rigid. I prefer to employ for the bottom strip 5 rubber having the desired characteristics, so that the margins 6, 6, provide means for uniting the insert with the channel securely and firmly against possibility of accidental or unintentional separation.

The body 4 and the bottom strip 5 are firmly united, conveniently by a layer of adhesive shown at 7 in Fig. 5. In the alternative, when the insert elements are made of rubber or the like they may be vulcanized.

The specific shape of the packing body 4 forms no part of the present invention, but I prefer that this element be given a half round contour. However, the square or rectangular cross sectional form of packing body 8 shown in Fig. 2 may be produced more economically by cutting by means of a gang of blades a large number of the bodies 8 from a relatively wide web of material.

It will of course be understood that the gasket is applied to operative position by first mounting the channel on the support, by any convenient means, such as tacks or the like driven through holes 9 in the channel base. The insert is then associated with the channel in the manner above indicated and as shown in the drawing.

It will be appreciated that it is not essential that distinct and real side flanges of relatively rigid material be formed on the insert as shown in Figs. 1, 2, 4 and 5. I have found it sufficient to provide what may be considered virtual side flanges, as shown in Figs. 6 and 7. The insert shown in these figures includes a bottom strip 5 of relatively rigid material which is no wider than the associated packing body 4. When the insert is forced down into the interior of the channel member, the side flanges of the channel member compress and indent the lower side walls of the packing body but not the outer edge portions of the strip 5, which then assume the form and function of flanges to underlie the side flanges of the channel member and retain the member and the insert together.

It is to be understood that I have shown and described the present invention in certain preferred forms of embodiment merely by way of exemplification and no limitation. The invention may be embodied in other and further modified forms, and all such embodiments, to the extent that they include the principles of the invention as pointed out in the appended claims, are to be deemed within the scope and purview thereof.

I claim:

1. A gasket including a base channel member having inturned side walls providing an interior undercut recess along each side of the channel, in combination with a separable insert including a bottom strip of relatively rigid material the side portions of which are received within and removably retained by the recesses, and a body of relatively soft, deformable material permanently secured to the bottom strip, extending above the channel member, and constituting the packing element of the gasket.

2. A gasket including a base channel member having internally recessed side walls, in combination with a separable insert including a body of relatively soft, deformable material and a bottom strip of harder, more rigid material secured to the body and having its side margins extending laterally therefrom and engaged with the recessed side walls of the channel member to secure the insert in the member.

3. A gasket including a base channel member having internally recessed side walls and adapted to be secured to a support, in combination with a separable insert including a body of sponge rubber and a bottom strip of harder, more rigid rubber secured to the body and having its side margins extending laterally from the body and engaged with the recessed side walls of the channel member to secure the insert in the member.

4. A gasket including a base channel member having inturned side walls providing an interior undercut recess along each side of the channel, in combination with a separable insert including a bottom strip of relatively rigid material the side margins of which are adapted to enter within and be retained by the recesses and a body of relatively soft, deformable material, narrower than the bottom strip and secured thereto, extending above the channel member and constituting the packing element of the gasket.

5. A gasket including a base channel member having inturned side walls providing an interior recess along each side of the channel, in combination with a separable insert including a bottom strip of relatively rigid material the side edges of which are adapted to enter within and be retained by the recesses, and a body of relatively soft, deformable material, of substantially the same width as the bottom strip and permanently secured thereto, extending above the channel member and constituting the packing element of the gasket.

6. A gasket including a base channel member having internally recessed side walls, in combination with a separable insert including a body of relatively soft, deformable material and a bottom strip of harder, more rigid material secured to the body, the channel member and the insert being secured together by engagement of the outer portions of the bottom strip within the recessed side walls of the member.

7. A gasket including a base channel member having internally recessed side walls and adapted to be secured to a support, in combination with a separable insert including a body of sponge rubber and a bottom strip of harder, more rigid rubber secured to the body, the channel member and the insert being secured together by engagement of the outer portions of the bottom strip within the recessed side walls of the member.

8. A gasket including a base channel member having internally recessed side walls, in combination with a separable insert including a body of relatively soft, deformable material and a bottom strip of harder, more rigid material of substantially the same width as the soft body and secured thereto, the channel member and the insert being secured together by engagement of the outer edges of the bottom strip within the recessed side walls of the member.

9. A gasket including a base channel member having internally recessed side walls and adapted to be secured to a support, in combination with a separable insert including a body of sponge rubber and a bottom strip of harder, more rigid rubber secured to the body and having its side edges substantially flush with the side walls of the body, the channel member and the insert being secured together by engagement of the side edges of the bottom strip on compression of the side walls of the body within the recessed side walls of the member.

In testimony whereof I affix my signature.

STEWART H. CLARK.